United States Patent
Nowak et al.

(10) Patent No.: US 10,055,748 B2
(45) Date of Patent: Aug. 21, 2018

(54) SURVEY TARGETING

(71) Applicant: Facebook, Inc., Menlo Park, CA (US)

(72) Inventors: Michael Nowak, San Francisco, CA (US); Ye Lu, Menlo Park, CA (US)

(73) Assignee: FACEBOOK, INC., Menlo Park, CA (US)

( * ) Notice: Subject to any disclaimer, the term of this patent is extended or adjusted under 35 U.S.C. 154(b) by 144 days.

(21) Appl. No.: 13/963,861

(22) Filed: Aug. 9, 2013

(65) Prior Publication Data
US 2015/0046225 A1    Feb. 12, 2015

(51) Int. Cl.
*G06F 17/30* (2006.01)
*G06Q 30/02* (2012.01)
*H04N 21/222* (2011.01)

(52) U.S. Cl.
CPC ... *G06Q 30/0203* (2013.01); *G06F 17/30595* (2013.01); *G06Q 30/0245* (2013.01); *H04N 21/222* (2013.01)

(58) Field of Classification Search
CPC .......................... G06Q 50/01; G06Q 30/0245
See application file for complete search history.

(56) References Cited

U.S. PATENT DOCUMENTS

| | | | |
|---|---|---|---|
| 2007/0204308 A1* | 8/2007 | Nicholas et al. | 725/86 |
| 2007/0219794 A1* | 9/2007 | Park | G06Q 10/10 704/246 |
| 2008/0126476 A1* | 5/2008 | Nicholas et al. | 709/203 |
| 2008/0313010 A1* | 12/2008 | Jepson | G06Q 30/02 705/7.32 |
| 2010/0077095 A1* | 3/2010 | Wong et al. | 709/231 |
| 2013/0054628 A1* | 2/2013 | Meierhoefer | G06F 17/30 707/758 |
| 2014/0257890 A1* | 9/2014 | Polonsky | G06Q 10/063 705/7.11 |
| 2014/0344034 A1* | 11/2014 | Goodman et al. | 705/14.12 |
| 2014/0357226 A1* | 12/2014 | Charugundla | H04W 4/023 455/411 |

* cited by examiner

*Primary Examiner* — Mohammad S Rostami
(74) *Attorney, Agent, or Firm* — Keller Jolley Preece

(57) ABSTRACT

Exemplary methods, apparatuses, and systems generate a first candidate list of users that meet a first set one or more characteristics and a second candidate list of users that meet a second set one or more characteristics. When a user appears in both of the first and second candidate lists, the user is selected to receive only the first survey or only the second survey based upon a first priority value for the first survey and a second priority value for the second survey.

21 Claims, 6 Drawing Sheets

SURVEY TARGETING

FIELD

The various embodiments described herein relate to surveying users of an online service. In particular, the embodiments relate to prioritized targeting of users for surveys without overexposing users to surveys over time.

BACKGROUND

A social networking system enables user interactions such as sharing information, designating other users or entities as connections (or otherwise following, becoming a fan of, connecting to, or forming relationships with, other users or entities), contributing and interacting with their connections, posting media or commentary, using applications, joining groups, listing and confirming attendance at events, and performing other tasks that facilitate social interaction. Presenting users of the social networking system with surveys, especially when combined with data based upon the aforementioned user interactions, has the potential for generating valuable information.

SUMMARY OF THE DESCRIPTION

Exemplary methods, apparatuses, and systems generate a first candidate list of users that meet a first set one or more characteristics and a second candidate list of users that meet a second set one or more characteristics. When a user appears in both of the first and second candidate lists, the user is selected to receive only the first survey or only the second survey based upon a first priority value for the first survey and a second priority value for the second survey.

In one embodiment, selecting the user to receive only the first survey or only the second survey includes determining a sum of the first and second priority values. The first survey is mapped to a first range of values, the first range being proportional to the amount of the sum contributed by the first priority value. The second survey is mapped to a second range of values, the second range being distinct from the first range and the second range being proportional to the amount of the sum contributed by the second priority value. A random value within the combined first and second ranges of values is generated and the user is selected to receive only the first survey if the random value is within the first range and the user is selected to receive only the second survey if the random value is within the second range Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein target the user base of an online service, such as a social network, for participation in surveys. The knowledge that may be obtained by surveying such a user base can create an incentive to overexpose users to surveys. If a user population is overexposed to surveys, however, user experience may suffer. Continuously surveying the same user may make the user reluctant to make use of the online service or negatively impact the quality of information gathered during a survey.

Embodiments described herein generate a candidate pool for each survey based upon the date of the last survey assigned to a user in addition to user demographic data, applications used by the user, etc. If multiple survey candidate pools include the same user(s), the user(s) are assigned a single survey based upon survey priority values. The selected users are presented surveys in a time-distributed manner. As a result, the surveys are targeted, maximize a valuable user-base without overexposing users to surveys, and present the surveys over a range of time that reflects varied user activity.

Figure 1:
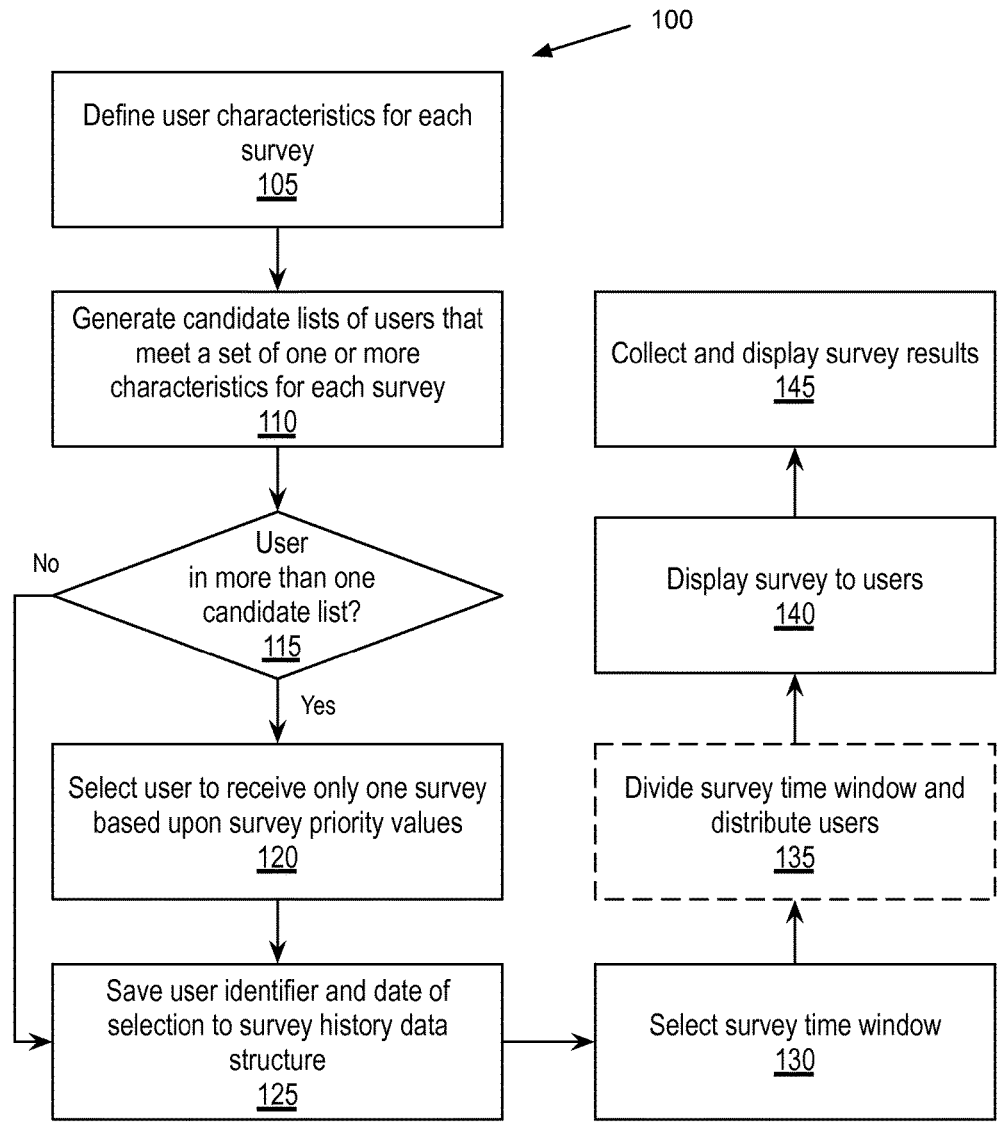
FIG. 1 is a flow chart illustrating an exemplary method of selecting one or more users to receive a survey, distributing the survey, and displaying survey results.

FIG. 1 is a flow chart illustrating exemplary method 100 of selecting one or more users of an online service to receive a survey, distributing the survey, and displaying survey results. At block 105, a computer defines one or more user characteristics for each survey to be initiated. In one embodiment, multiple surveys are initiated within the same time period. The user characteristics are received as an input in initiating each survey or as a part of a default set of characteristics applied by the computer.

In one embodiment, the user characteristics reflect that a given user has not been selected to receive a previous survey within a threshold period of time. The threshold period of time may be defined by the online service or by the creator of the survey. For example, the computer may apply a default prohibition of selecting a user for a survey more than once a year. Alternatively, the threshold period of time may be dependent upon the type of survey previously presented to the user. For example, if the last survey assigned to the user was only a single question or otherwise simple, the threshold may be set to a smaller amount within a range of time in which a user should not be surveyed. Similarly, if the last survey assigned to the user was lengthy or otherwise onerous, the threshold may be set to a larger amount within a range of time in which a user should not be surveyed. The threshold period of time may be similarly dependent upon the type of survey to be presented to the user.

In one embodiment, the user characteristics include a frequency of use of the online service. For example, a survey may be targeted at users that are active on a daily basis to focus on a core audience. Additionally, surveys may (by selection or default setting) be assigned to users that are active at least once a month (or another period of time) in order to target a more general population that uses the online service with some consistency.

In one embodiment, the user characteristics are defined by a user profile and/or interactions with the online service. For example, a social networking system enables user interactions such as sharing information, designating other users or entities as connections (or otherwise following, becoming a fan of, connecting to, or forming relationships with, other users or entities), contributing and interacting with their connections, posting media or commentary, using applications, joining groups, listing and confirming attendance at events, and performing other tasks that facilitate social interaction.

Figure 2:
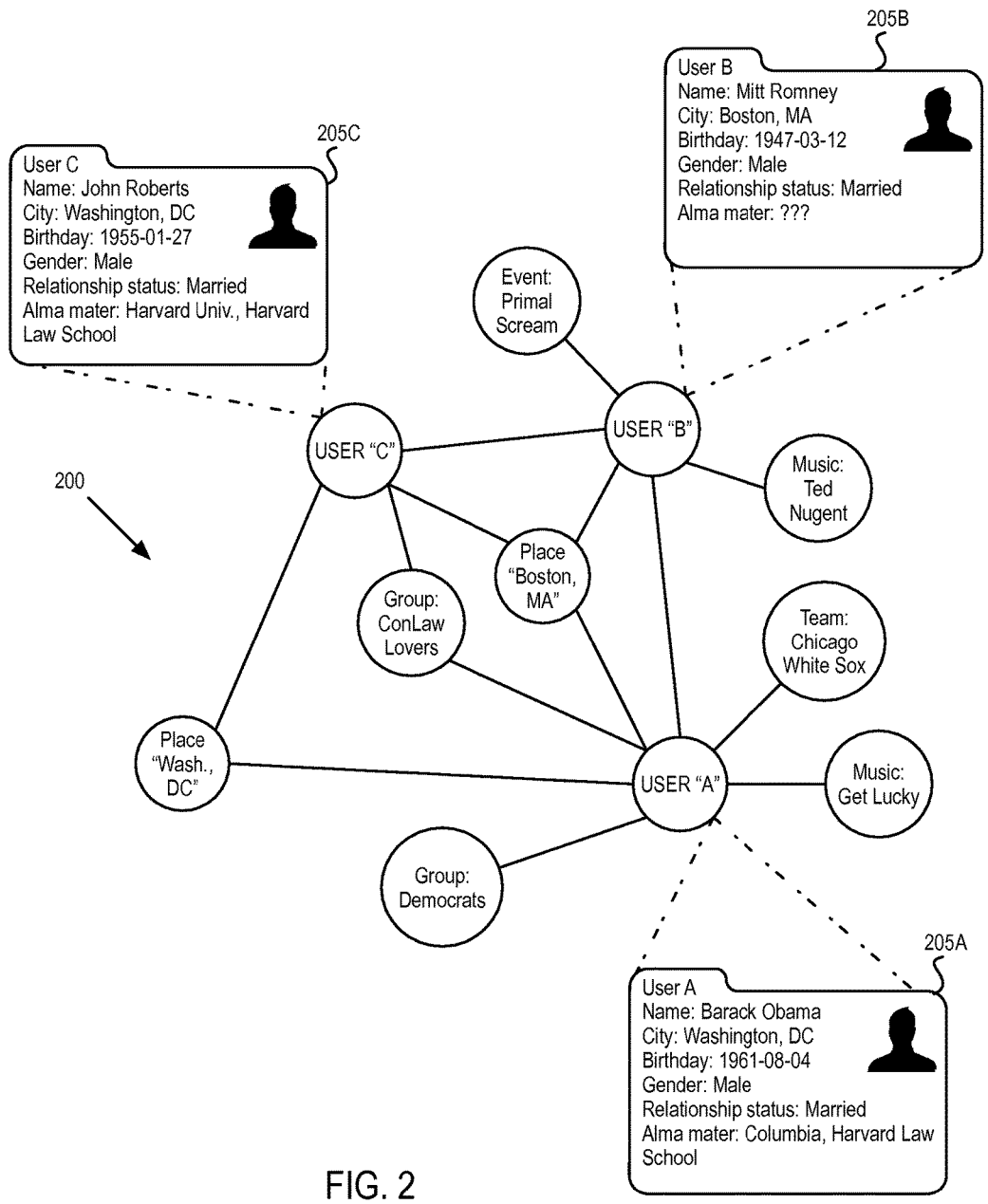
FIG. 2 illustrates an exemplary graph of user characteristics.

FIG. 2 illustrates exemplary graph 200 of user characteristics. In graph 200, objects are illustrated as circles and actions are illustrated as connections between circles. Developers of the social network or corresponding social network applications define actions to represent different ways that users may interact with the social network and/or their applications. As users perform actions, connections are made between users and objects. For example, User A has performed a number of actions within the social network, indicating that he previously lived in Boston, currently lives in Washington D.C., joined groups for Democrats and ConLaw Lovers, is following the White Sox, used an application to listen to "Get Lucky," and is friends with User B. User B and User C have also performed a number of actions with respect to objects within graph 200.

In one embodiment, users are able to add demographic information to user profiles 205A-C. In one embodiment, for demographic information that has not been entered by a user, a social network application generates an estimate based upon the user's actions, connections, and/or actions of connections. For example, User B has not entered an alma mater into user profile 205B. A social network application may determine from User B's contacts, activities, cities of residence, etc. that User B's likely alma mater is one or both of Brigham Young University and Harvard University.

In one embodiment, demographic data further includes a weight or score indicating an affinity between a user and an object. For example, repeated user action with one object may indicate a stronger affinity for said object than another object with which the user has limited interaction. First degree connections, e.g., the friendship between User A and User B, may indicate a stronger affinity than second degree connections, e.g., User A is friends with User B, who is friends with User C, creating a second degree connection between User A and User C. An indication that two users are married may indicate a stronger affinity than if two users are friends. Additionally, temporal and geographic proximity of actions/users are other exemplary indicators of affinity.

The illustrated objects, connections, profiles, and affinity values are exemplary user characteristics used for survey targeting. In one embodiment, users may select privacy settings to control what characteristics are shared, with whom characteristics are shared, and/or what characteristics are used for survey targeting.

Returning to FIG. 1, at block 110, the computer generates a candidate list for one or more surveys of users that meet the corresponding set of one or more of the characteristics. User characteristics may be stored in one or more databases or other data structures. A search of the data structure(s) for one or more user characteristics yields a list of user identifiers. For example, a first survey may be targeted at users that use an application for playing music within a social networking system, have been active in the last month, and have not been selected for a survey within a threshold period of time. A second survey may be targeted at users that live in Washington D.C., have been active in the last month, and have not been selected for a survey within a threshold period of time. A search of a data structure storing the characteristics described with reference to FIG. 2 may yield a first candidate list including Users A and B as playing music (if Users A and B have also been active in the last month and not previously selected for a survey within a threshold period of time). Similarly, a search of the data structure storing the characteristics described with reference to FIG. 2 may yield a second candidate list including Users A and C as living in Washington D.C. (if both users have also been active in the last month and not previously selected for a survey within a threshold period of time).

In one embodiment, if multiple surveys have the same set of characteristics, a single candidate list is generated for these surveys. For example, a survey of all users that are active on a monthly basis generates large candidate list. If multiple surveys are targeted at this group, the multiple surveys are mapped to the single candidate list representing users that are active on a monthly basis.

In one embodiment, surveys are defined with a maximum number of users to receive the survey. For example, a survey may be initiated with a maximum user count of 10,000. If more than 10,000 users meet the characteristics, the computer selects 10,000 from the group in a random or ordered manner and adds the 10,000 users to the candidate list.

At block 115, the computer determines if one or more users have been included in more than one candidate list. As used herein, if more than one survey is mapped to a single candidate list, those users are considered to have been included in more than one candidate list. Continuing the previous example, User A used an application to play music and lives in Washington D.C., so the computer included User A in both of the first and second candidate lists.

If one or more users have been included in more than one candidate list, at block 120, the computer selects a single survey for each user based upon survey priority values. In one embodiment, the priority-based selection includes selecting the user to receive the survey with the highest priority value. Alternatively, users included in multiple candidate lists are distributed between surveys in proportion to the relative value of each survey priority value.

Figure 3:
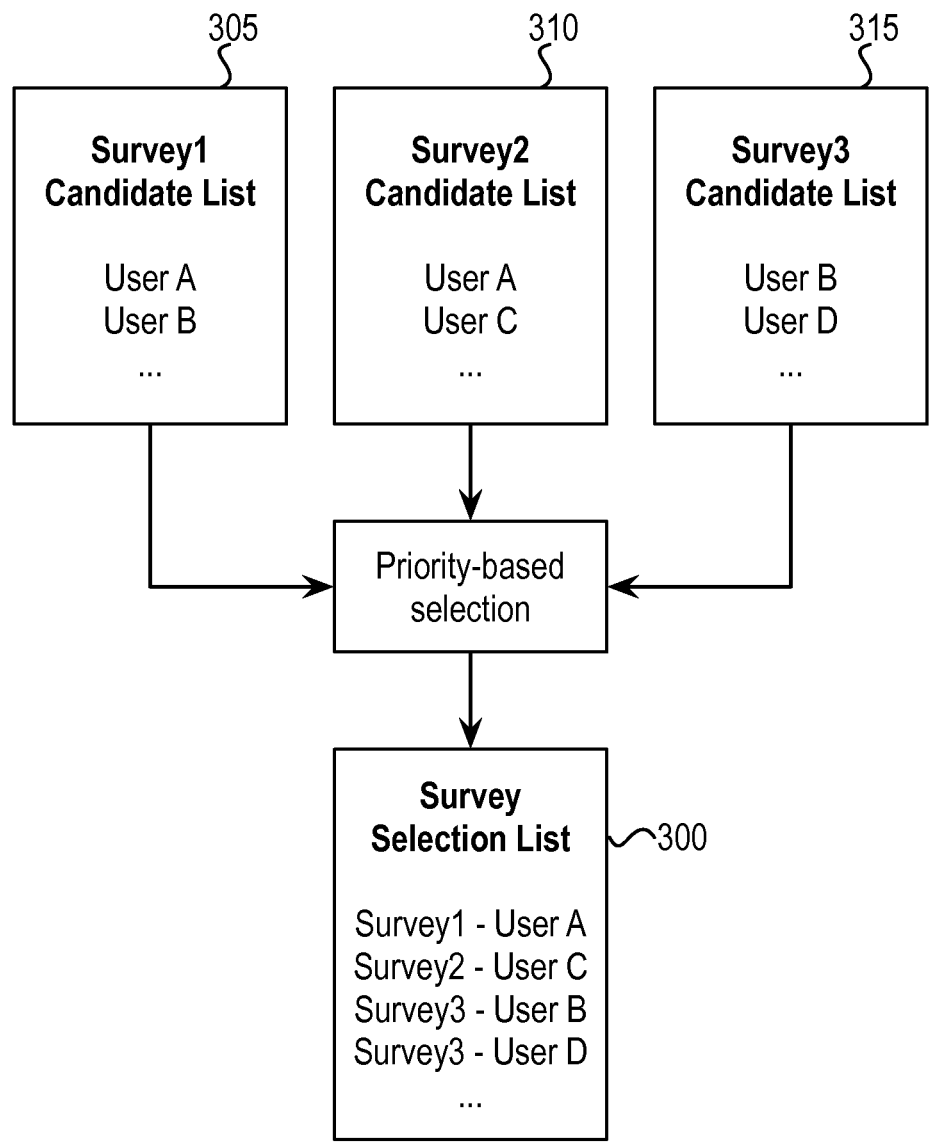
FIG. 3 illustrates a survey selection list generated using priority-based selection.

FIG. 3 illustrates the generation of survey selection list 300 using priority-based selection. The computer generated three candidate lists, survey1 candidate list 305, survey2 candidate list 310, and survey3 candidate list 315, for Users A-D based upon user characteristics (e.g., as described above). A greater or lesser number of surveys/candidate lists and users may be included in the priority-based selection.

The computer determines that both candidate list 305 and candidate list 310 include User A and that both candidate list 305 and candidate list 315 include User B. Applying survey priority values, the computer generates survey selection list 300. Each user in survey selection list 300 is selected to receive only a single survey. For example, using priority-based selection, the computer assigned Survey 1 to User A, Survey 2 to User C and Survey 3 to Users B and D. As described above, the priority-based selection may include selecting the user to receive the survey with the highest priority value. For example, Survey3 may have a higher priority value than Survey1, resulting in User B being assigned Survey3 rather than Survey1. In a similar fashion, Survey1 may have a higher priority value than Survey 2, resulting in User A being assigned Survey1 rather than Survey 2.

Figure 4:
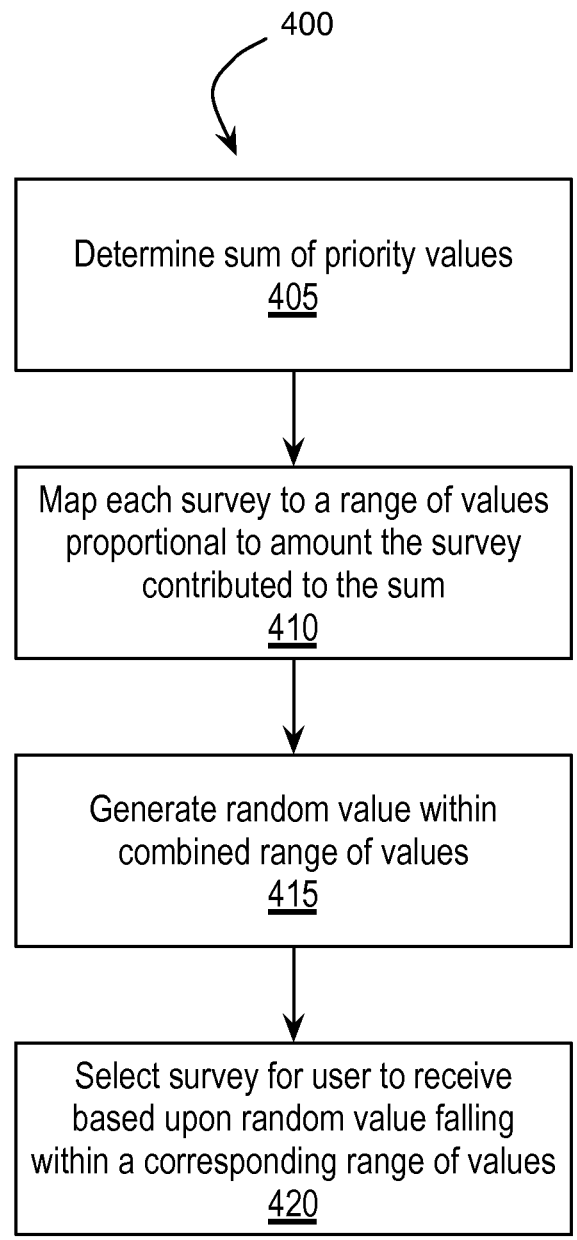
FIG. 4 is a flow chart illustrating an exemplary method of selecting between multiple surveys based upon proportional priority values.

FIG. 4 is a flow chart illustrating exemplary method 400 of selecting between multiple surveys based upon proportional priority values. At block 405, the computer determines the sum of the survey priority values for each survey candidate list including a given user. For example, User A is included in both Survey1 and Survey2 candidate lists. If Survey1 has a priority value of 30 and Survey2 has a priority value of 20, the sum would be 50. If User A were included in additional candidate lists, additional priority values would be added to the sum.

At block 410, the computer maps each survey to a range of values proportional to the amount the survey contributed to the priority value sum. For example, Survey1 may be mapped to 1-30 and Survey2 may be mapped to 31-50. Again, if User A were included in additional candidate lists, additional priority values would be added to the sum and the additional surveys would be mapped to corresponding ranges.

Alternatively, the combined range of values may be a value other than the sum of the priority values. For example, the combined range may be 1-100 and Survey1 may be mapped to the proportional range of 1-60 and Survey2 may be mapped to the proportional range of 61-100.

At block 415, the computer generates a random value within the combined range of values. For example, if the combined range of values is 1-50, the computer generates a random number within the range 1-50.

At block 420, the computer selects a survey for the user based upon the random value falling within a corresponding range of values. Continuing with the example above, a random value of 26 is within the range of 1-30 and would result in the computer assigning Survey1 to User A. Likewise, a random value of 42 is within the range of 31-50 and would result in the computer assigning Survey2 to User A.

With increased numbers of users overlapping multiple candidate lists, method 400 provides proportional distribution between surveys based upon their relative priority values rather than assigning all users to the highest priority survey.

In yet another embodiment of users being included in more than one candidate list, the computer determines a proportional amount each survey contributes to a sum as described above. Rather than using a random number falling into a corresponding range of values, however, a corresponding proportion of overlapping users are assigned to each survey. For example, if Survey1 has a priority value of 30 and Survey2 has a priority value of 20, the sum would be 50. Survey1 would be assigned 60% of the overlapping users and Survey2 would be assigned 40% of the overlapping users (30 being 60% of the sum 50 and 20 being 40% of the sum 50). If Survey1 and Survey2 have 10 common users on their candidate lists, 6 would be assigned Survey1 and 4 would be assigned Survey2. The users assigned to each Survey may be selected randomly or in an ordered manner.

Returning to FIG. 1, if no users overlap candidate lists, or once priority-based selection has been applied, at block 125, the computer saves the user identifier and date of the selection of the survey for each user to a survey history data structure. In one embodiment, the computer further saves a survey identifier along with the user identifier and the date. The computer may look up the user in the survey history data structure when the user is considered for a candidate list. For example, the date stored with the user identifier will enable the computer to determine if the user was selected to receive a survey within a threshold period of time. Additionally, the survey identifier will enable the computer to generate a candidate list of users that were previously surveyed on a particular subject matter. A second survey of the same users will provide insight to any change of survey results over time.

At block 130, for each survey, the computer selects a survey time window for the start and the end of the survey. In one embodiment, the survey is distributed to selected users upon completion of user selection, at a default amount of time following user selection, or at a default time of day. Additionally, the survey may be available for user responses within a default period of time. Alternatively, a user initiating the survey selects one or both of a start time and an end time for the survey.

At block 135, for each survey, the computer optionally divides the time window into a plurality of start times and distributes users among the plurality of start times. For example, usage of an online service like a social network may differ from morning, to mid-day, to afternoon, and into the evening. Likewise, usage may differ between days of the week. Distributing users across a plurality of start times generates a survey pool that may reflect a more accurate spectrum of use of the online service.

At block 140, the computer displays or otherwise transmits the survey to users at the designated start time(s). For example, the survey may be pushed to the user via a messaging system, such as via email, SMS, or instant messenger. In one embodiment, the user will be offered the opportunity to take a survey if the user uses the online service within a time period following the user start time. For example, the computer may present the survey to the user in a newsfeed or other online service homepage if the user logs in/visits the online within 24 hours of the survey start time. If a user does not log in during that time period, the user will not be offered the survey. Once presented with the survey, the user may accept or decline the opportunity to take the survey. Given that the user identifier is saved to the history data structure upon assignment, regardless of whether or not the user is actually exposed to the survey and regardless of whether or not the user accepts the opportunity to take the survey, the assignment of the survey may preclude future surveys from being assigned to the user for a threshold period time, as described with reference to block 105.

At block 145, the computer collects and displays results of the survey. For example, each time a user completes a survey, the user's answers are submitted to the online service. Survey results are calculated and displayed to the entity that initiated the survey in response reaching the end of the survey time window.

In one embodiment, a survey is initiated as a part of a product/service experiment. For example, the online service may include an experiment platform that allows developers to present new features to a limited number of users or present multiple versions of a product to different groups of users. The experiment platform automatically defines a user characteristic for a survey candidate list in response to user participation in an experiment. Upon a completion of an experiment time period, the survey is distributed to the participating users as described above. The experiment platform gathers metrics for analyzing the experiment, e.g., comparing an experimental feature to a control group, comparing advertising revenue between experimental features, etc. Survey results are gathered and displayed with the results of the product experiment.

Figure 5:
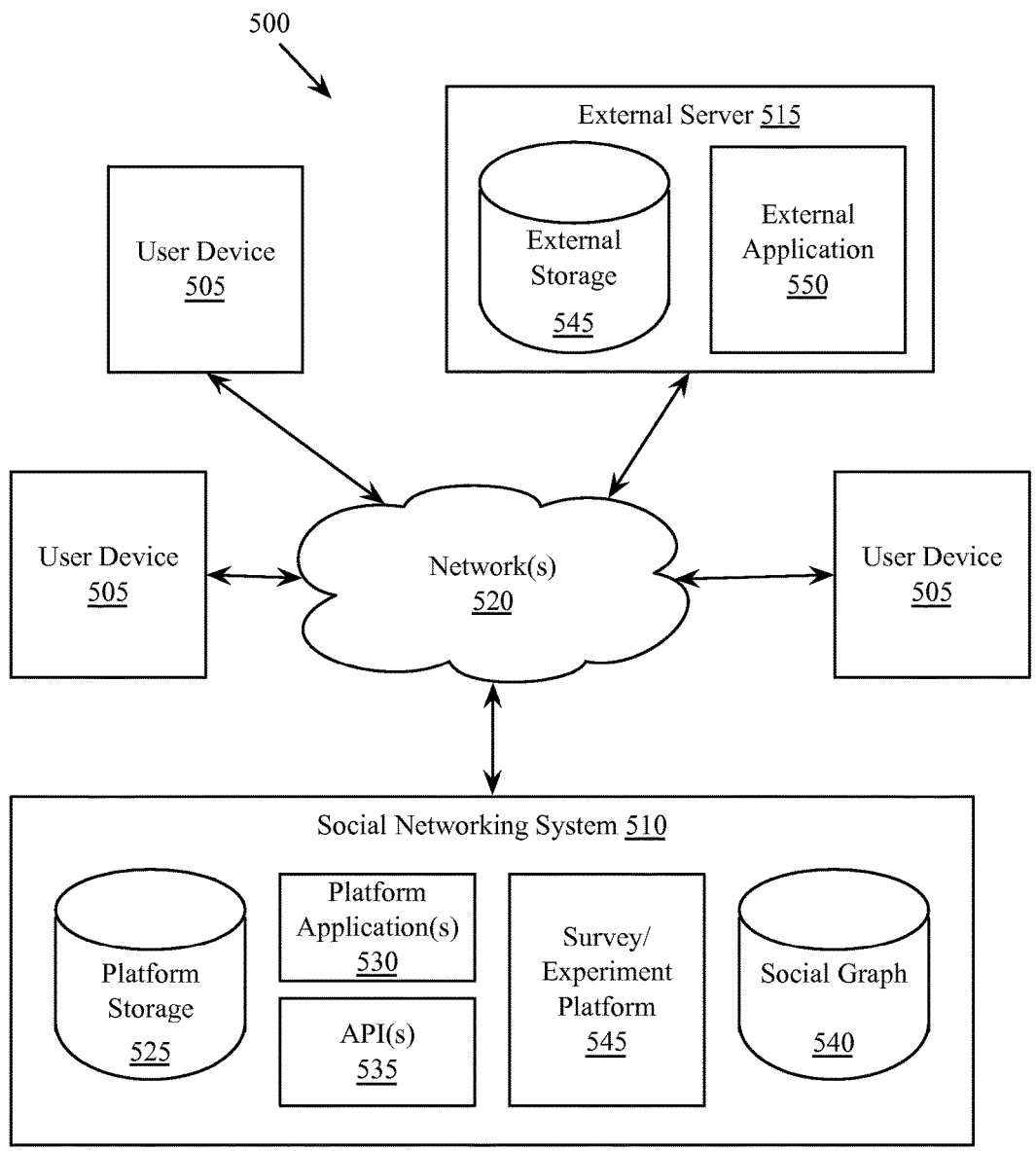
FIG. 5 illustrates, in block diagram form, an exemplary social network.

As described in the examples above, an embodiment of the online service is a social network. FIG. 5 illustrates, in block diagram form, exemplary social network 500. Exemplary social network 500 includes user devices 505, social networking system 510, and external server 515 coupled to one or more networks 520. A user interacts with social networking system 510 using a user device 505, such as a personal computer or a mobile phone. For example, user device 505 communicates with social networking system 510 via an application such as a web browser or native application. Typical interactions between user device 505 and social networking system 510 include receiving news feed publications, operations to view profiles of other users of social networking system 510, contributing and interacting with media items, joining groups, listing and confirming attendance at events, checking in at locations, liking certain pages/posts, creating pages, and initiating, viewing, completing, or displaying results of a survey, as described herein.

Social networking system 510 includes platform storage 525, one or more platform applications 530, one or more application programming interfaces (API's) 535, social graph 540 (e.g., as described with reference to FIG. 2), and survey/experiment platform 545. Platform storage 525 stores user preferences/settings, profile data, etc. Exemplary platform applications 530 include the platform for social interactions (e.g., publishing posts, pictures, etc.) as well as social games, messaging services, playing music, and any other application that uses the social platform provided by social networking system 510.

In one embodiment, methods 100 and 400 described above are performed by survey/experiment platform 545. Characteristic data is maintained within and received from platform storage 525 and/or social graph 540.

One or more API's 535 enable external applications 550 to work with social networking system 510. For example, external application 550 utilizes an API 535 to authenticate a user based upon the user's social networking log in username and password. Additionally, external application 550 utilizes one or more API's 535 to run the application within platform application 530, to publish a post to platform application 530, to access the user's social network connections in social graph 540, etc. In one embodiment, methods 100 and 400 described above are performed, in whole or part, by external application 550 and data is received from and/or stored in one or more of the external storage 555, platform storage 525, and social graph 540.

Figure 6:
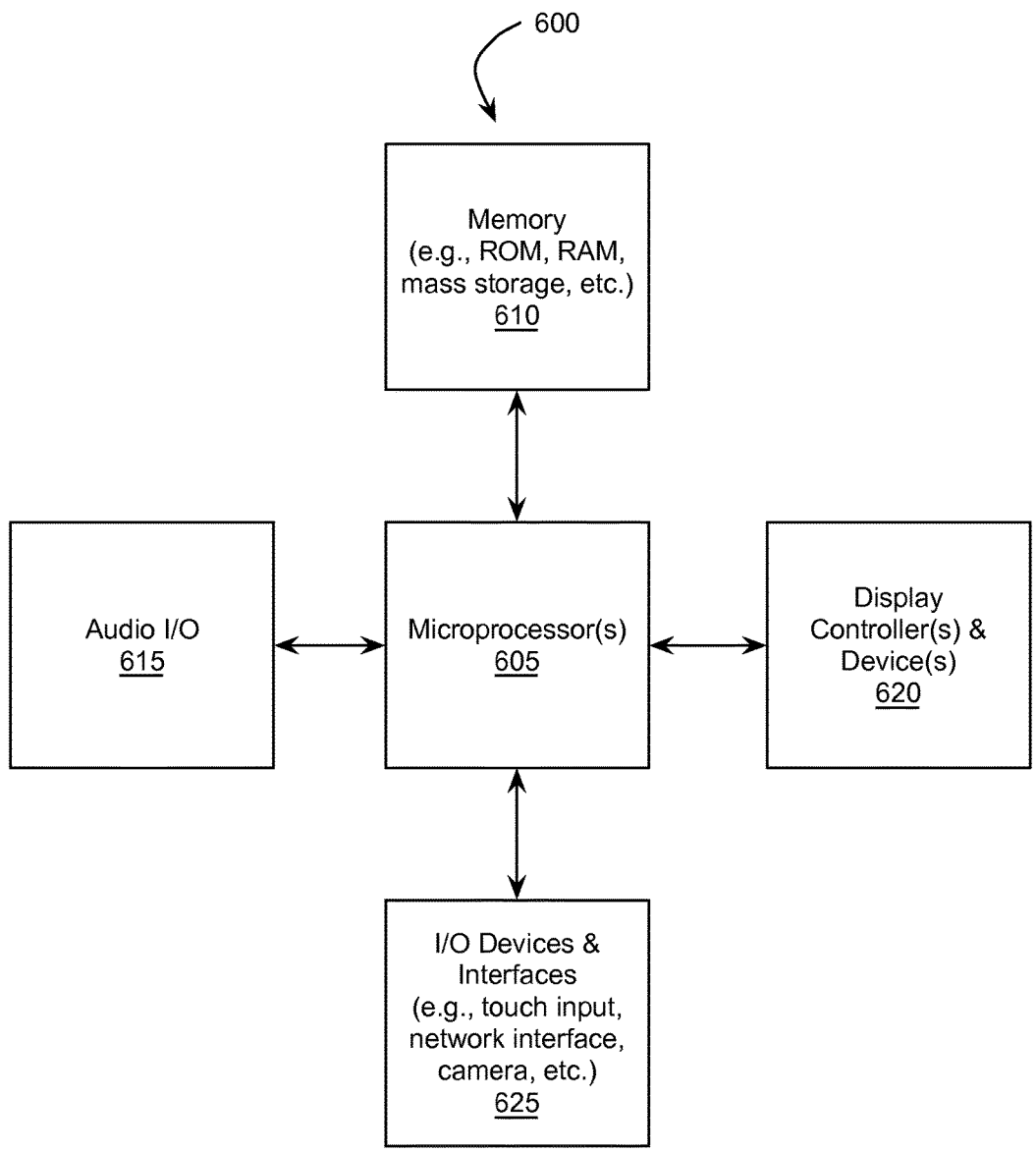
FIG. 6 illustrates, in block diagram form, an exemplary processing system to implement an embodiment of selecting one or more users to receive a survey, distributing the survey, and/or displaying survey results.

FIG. 6 illustrates a block diagram for exemplary data processing system 600 to implement an embodiment of selecting one or more users to receive a survey, distributing the survey, and/or displaying survey results. Data processing system 600 includes one or more microprocessors 605 with one or more processor cores. Several connected system components (e.g., multiple connected chips) may be connected to processors 605. Alternatively, data processing system 600 may be a system on a chip (SOC), where most or all system components reside on a single chip. Data processing system 600 includes memory 610, which is coupled to processors 605. Memory 610 is used for storing data, metadata, and programs for execution by the microprocessors 605. Memory 610 includes one or more forms of volatile or non-volatile memories, such as Random Access Memory ("RAM"), Read Only Memory ("ROM"), a solid-state disk ("SSD"), Flash Memory, Phase Change Memory ("PCM"), or other types of data storage appropriate for use in the data processing system 600. In one implementation of the data processing system 600, memory 610 is stored internally to the system. Additionally, one or more forms of distributed memory may be used to supplement or replace the internally stored memory.

The data processing system 600 includes an audio input/output subsystem 615, which has at least one microphone, to audio input from a user, such as voice instructions. The audio input/output subsystem 615 optionally includes one or more a speakers, to play music or some other audio, or to play audio notifications.

Display controller and attached display device 620 provide a graphical user interface for the user, to interact with data processing system 600. For example, the graphical user interface provides access to social networking system 500 via a web browser, or via an interface provided by an application executing on data processing system 600. Additionally, the graphical user interface may be used to present options in the initiation of a survey, to present a survey to a user, or to display survey results.

Data processing system 600 also includes one or more input or output ("I/O") devices and interfaces 625, which are provided to allow a user to transfer data to and from system 600, including input commands. Attached I/O devices 625 include one or more input devices, such as a mouse, keypad or a keyboard, touch or multi-touch input panel, camera, or an optical scanner. Attached I/O devices 625 can also feature one or more bi-directional input/output devices such as a network interface, modem, other known I/O devices, or a combination of such I/O devices.

I/O devices and interfaces 625 may also include a connector for a dock or a connector for a USB interface, Ethernet, FireWire, Thunderbolt, Lightning, etc. to connect system 600 with another device, external component, or a network. Exemplary I/O devices and interfaces 625 also include wireless transceivers, such as an IEEE 802.11 transceiver, an infrared transceiver, a Bluetooth transceiver, a wireless cellular telephony and data transceiver (e.g., GSM, CDMA, WiMAX, LTE, LTE Advanced), or some other wireless protocol to connect data processing system 600 with another device, external component, or a network. One or more system buses or internal SOC buses may be used to interconnect the various components of data processing system 600.

Data processing system 600 is an exemplary representation of one or more of the user's device 505, at least a portion of the social networking system 510, or the external server 515. For example, data processing system 600 may be a personal computer, a tablet computer, a smartphone, a network enabled media player, an entertainment system, a personal data assistance (PDA) or devices which combine aspects or functions of these devices, such as a media player combined with a PDA and a cellular telephone. Additionally, implementations of data processing system 600 can function as a network computer, a data server, or an embedded processing device within another device or consumer electronic product. As used herein, the terms computer, system, device, processing device, and "apparatus comprising a processing device" may be used interchangeably with data processing system 600 and include the above-listed exemplary embodiments. It will be appreciated that additional components, not shown, may also be part of system 600, and, in certain embodiments, fewer components than that shown in FIG. 6 may also be used in data processing system 600.

Aspects of the various embodiments described may be embodied, at least partially, in software. That is, the computer-implemented methods may be carried out in a computer system or other data processing system in response to its processor or processing system executing sequences of instructions contained in a memory, such as memory 610 or other non-transitory machine-readable storage medium. The software may further be transmitted or received over a network (not shown) via network interface device 625. In various embodiments, hardwired circuitry may be used in combination with the software instructions to implement the present embodiments. Thus, the techniques are not limited to any specific combination of hardware circuitry and software, or to any particular source for the instructions executed by data processing system 600.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing a Field-Programmable Gate Array (FPGA), Application-Specific Integrated Circuit (ASIC), a processor, a computer, or a computer system, including a networked computer system. Modules and components of hardware or software implementations can be divided or combined without significantly altering embodiments of the invention.

In the foregoing specification, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:
    generating a first candidate list of users that meet a first set of one or more characteristics, wherein the users in the first candidate list are candidates for receiving a first survey;
    generating a second candidate list of users that meet a second set of one or more characteristics, wherein the users in the second candidate list are candidates for receiving a second survey;
    determining that a user appears in both of the first candidate list for receiving the first survey and the second candidate list for receiving the second survey;
    selecting, in response to determining that the user appears in both the first candidate list for receiving the first survey and the second candidate list for receiving the second survey, the user to receive only the first survey or only the second survey based upon a first priority value for the first survey and a second priority value for the second survey by:
        determining a sum of the first priority value and second priority value;
        mapping the first survey to a first range of values, wherein the first range is proportional to an amount of the sum contributed by the first priority value;
        mapping the second survey to a second range of values, wherein the second range is distinct from the first range, and wherein the second range is proportional to an amount of the sum contributed by the second priority value;
        generating a random value within the combined first ranges of value and second ranges of value; and
        selecting the user to receive only the first survey if the random value is within the first range and selecting the user to receive only the second survey if the random value is within the second range; and
    distributing the selected survey for display to the user.

2. The computer-implemented method of claim 1, wherein generating the first candidate list of users that meet the first set of one or more characteristics for receiving the first survey comprises:
    querying a data structure with the first set of one or more characteristics for receiving the first survey, the data structure storing user identifiers and corresponding user characteristics for users of a communication system; and
    receiving user identifiers for a set of users having user characteristics matching the first set of one or more characteristics for receiving the first survey.

3. The computer-implemented method of claim 1, wherein the first set of one or more characteristics includes each user of the first candidate list not having been selected to receive a previous survey within a threshold period of time.

4. The computer-implemented method of claim 3, wherein the threshold period of time is dependent upon a type of a previous survey each user was selected to receive.

5. The computer-implemented method of claim 1, further comprising: saving a user identifier for the user and a date of the selection of the user to receive the first or second survey in a data structure.

6. The computer-implemented method of claim 5, wherein the first set of one or more characteristics includes participation by a user in a previous survey, the generation of the first candidate list comprising: determining that the user participated in the previous survey by looking up an entry in the data structure including the user identifier and an identifier for the previous survey.

7. The computer-implemented method of claim 1, further comprising: selecting a window of time in which the first survey is to be conducted; dividing the window of time into a plurality of start times; distributing a plurality of users selected to receive the first survey across the plurality of start times; and displaying, following each start time, the first survey to one or more of the plurality of users distributed to the start time.

8. The computer-implemented method of claim 7, wherein the first survey is displayed to the one or more of the plurality of users distributed to the start time in response to the one or more of the plurality of users using a communication system within a predetermined period of time following the start time.

9. The computer-implemented method of claim 1, wherein the first set of one or more characteristics includes users that participated in a product experiment, the method further comprising: displaying results of the first survey with results of the product experiment.

10. A non-transitory computer-readable medium storing instructions which, when executed by one or more processors in a processing device, cause the processing device to perform steps comprising:
  generating a first candidate list of users that meet a first set of one or more characteristics, wherein the users in the first candidate list are candidates for receiving a first survey;
  generating a second candidate list of users that meet a second set of one or more characteristics, wherein the users in the second candidate list are candidates for receiving a second survey;
  determining that a user appears in both of the first candidate list for receiving the first survey and the second candidate list for receiving the second survey;
  selecting, in response to determining that the user appears in both the first candidate list for receiving the first survey and the second candidate list for receiving the second survey, the user to receive only the first survey or only the second survey based upon a first priority value for the first survey and a second priority value for the second survey by:
    determining a sum of the first priority value and second priority value;
    mapping the first survey to a first range of values, wherein the first range is proportional to an amount of the sum contributed by the first priority value;
    mapping the second survey to a second range of values, wherein the second range is distinct from the first range, and wherein the second range is proportional to an amount of the sum contributed by the second priority value;
    generating a random value within the combined first ranges of value and second ranges of value; and
    selecting the user to receive only the first survey if the random value is within the first range and selecting the user to receive only the second survey if the random value is within the second range; and
  distributing the selected survey for display to the user.

11. The non-transitory computer-readable medium of claim 10, wherein generating the first candidate list of users that meet the first set of one or more characteristics for receiving the first survey comprises:
  querying a data structure with the first set of one or more characteristics for receiving the first survey, the data structure storing user identifiers and corresponding user characteristics for users of a communication system; and
  receiving user identifiers for a set of users having user characteristics matching the first set of one or more characteristics for receiving the first survey.

12. The non-transitory computer-readable medium of claim 10, wherein the first set of one or more characteristics includes each user of the first candidate list not having been selected to receive a previous survey within a threshold period of time.

13. The non-transitory computer-readable medium of claim 12, wherein the threshold period of time is dependent upon a type of a previous survey each user was selected to receive.

14. The non-transitory computer-readable medium of claim 10, the steps further comprising:
  saving a user identifier for the user and a date of the selection of the user to receive the first or second survey in a data structure.

15. The non-transitory computer-readable medium of claim 14, wherein the first set of one or more characteristics includes participation by a user in a previous survey, the generation of the first candidate list comprising:
  determining that the user participated in the previous survey by looking up an entry in the data structure including the user identifier and an identifier for the previous survey.

16. The non-transitory computer-readable medium of claim 10, the steps further comprising:
  selecting a window of time in which the first survey is to be conducted;
  dividing the window of time into a plurality of start times;
  distributing a plurality of users selected to receive the first survey across the plurality of start times; and
  displaying, following each start time, the first survey to one or more of the plurality of users distributed to the start time.

17. The non-transitory computer-readable medium of claim 16, wherein the first survey is displayed to the one or more of the plurality of users distributed to the start time in response to the one or more of the plurality of users using a communication system within a predetermined period of time following the start time.

18. The non-transitory computer-readable medium of claim 10, wherein the first set of one or more characteristics includes users that participated in a product experiment, the steps further comprising:
  displaying results of the first survey with results of the product experiment.

19. A system comprising:
  at least one processor; and
  at least one non-transitory computer readable storage medium storing instructions that, when executed by the at least one processor, cause the system to:
  generate a first candidate list of users that meet a first set of one or more characteristics, wherein the users in the first candidate list are candidates for receiving a first survey;
  generate a second candidate list of users that meet a second set of one or more characteristics, wherein the users in the second candidate list are candidates for receiving a second survey;
  determine that a user appears in both of the first candidate list for receiving the first survey and the second candidate list for receiving the second survey;
  select, in response to determining that the user appears in both the first candidate list for receiving the first survey and the second candidate list for receiving the second survey, the user to receive only the first survey or only the second survey based upon a first priority value for the first survey and a second priority value for the second survey by:
    determining a sum of the first priority value and second priority value;

mapping the first survey to a first range of values, wherein the first range is proportional to an amount of the sum contributed by the first priority value;

mapping the second survey to a second range of values, wherein the second range is distinct from the first range, and wherein the second range is proportional to an amount of the sum contributed by the second priority value;

generating a random value within the combined first ranges of value and second ranges of value; and selecting the user to receive only the first survey if the random value is within the first range and selecting the user to receive only the second survey if the random value is within the second range; and distribute the selected survey for display to the user.

20. The system of claim 19, wherein the first set of one or more characteristics comprises each user of the first candidate list not having been selected to receive a previous survey within a threshold period of time; and the threshold period of time is dependent upon a type of a previous survey each user was selected to receive.

21. The system of claim 19, wherein the instructions, when executed by the at least one processor, cause the system to generate the first candidate list of users that meet the first set of one or more characteristics for receiving the first survey by:

querying a data structure with the first set of one or more characteristics for receiving the first survey, the data structure storing user identifiers and corresponding user characteristics for users of a communication system; and receiving user identifiers for a set of users having user characteristics matching the first set of one or more characteristics for receiving the first survey.

* * * * *